(12) United States Patent
Kobza

(10) Patent No.: US 9,290,051 B1
(45) Date of Patent: Mar. 22, 2016

(54) UNIVERSAL VEHICLE AXLE

(71) Applicant: Tom Kobza, Billings, MT (US)

(72) Inventor: Tom Kobza, Billings, MT (US)

( * ) Notice: Subject to any disclaimer, the term of this patent is extended or adjusted under 35 U.S.C. 154(b) by 436 days.

(21) Appl. No.: 13/715,601

(22) Filed: Dec. 14, 2012

Related U.S. Application Data

(60) Provisional application No. 61/610,010, filed on Mar. 13, 2012.

(51) Int. Cl.
  *B60B 35/00* (2006.01)
  *B60B 35/04* (2006.01)
  *B60B 35/14* (2006.01)
  *B62D 55/104* (2006.01)
  *B62D 55/32* (2006.01)

(52) U.S. Cl.
  CPC ............. *B60B 35/00* (2013.01); *B60B 35/04* (2013.01); *B60B 35/14* (2013.01); *B62D 55/104* (2013.01); *B62D 55/32* (2013.01)

(58) Field of Classification Search
  CPC ...... B60B 35/00; B60B 35/004; B60B 35/02; B60B 35/04; B60B 35/14
  USPC ............... 301/124.1, 125, 130–132, 134–135
  See application file for complete search history.

(56) References Cited

U.S. PATENT DOCUMENTS

| | | | |
|---|---|---|---|
| 313,517 A * | 3/1885 | Peckham | 301/124.1 |
| 894,131 A * | 7/1908 | Frederick | 301/132 |
| 1,206,728 A * | 11/1916 | Pauly | 301/130 |
| 6,926,371 B1 * | 8/2005 | Gagnon | 301/132 |
| 7,954,832 B2 * | 6/2011 | Varela et al. | 280/124.1 |
| 2006/0001312 A1 * | 1/2006 | MacKarvich | 301/124.1 |

* cited by examiner

*Primary Examiner* — Jason Bellinger
(74) *Attorney, Agent, or Firm* — Suiter Swantz pc llo

(57) ABSTRACT

A universal vehicle axle assembly may include, but is not limited to: at least one axle including at least one insert recess; and at least one axle insert configured for insertion into the at least one insert recess.

12 Claims, 6 Drawing Sheets

UNIVERSAL VEHICLE AXLE

PRIORITY

The present application claims priority under 35 U.S.C. 119 to Provisional Patent Application Ser. No. 61/610,010 incorporated herein in its entirety to the extent not inconsistent herewith.

BACKGROUND

Various vehicle manufacturers, specifically snowmobile manufacturers, may include axle assemblies having widely varying configurations in their products. When an axle assembly is damaged and requires replacement, a user may be required to purchase an entire axle assembly from the original equipment manufacturer (OEM). Because each axle assemble for each manufacturer is different, a vehicle repair entity may be required to maintain a stock of each part to service products of multiple manufacturers.

However, much of the structure of such axle assemblies may be common to the various manufacturers making the purchase and storage of multiple axle assembly models redundant and inefficient.

As such, it may be desirable to provide a universal vehicle axle configured for use with multiple vehicles from multiple manufacturers.

SUMMARY

A universal vehicle axle assembly may include, but is not limited to: at least one axel including at least one insert recess; and at least one axel insert configured for insertion into the at least one insert recess.

BRIEF DESCRIPTION OF THE DRAWINGS

The disclosure will become more fully understood from the following detailed description, taken in conjunction with the accompanying drawings, wherein like reference numerals refer to like elements, in which Figure Reference No.

DETAILED DESCRIPTION

Figure 1:
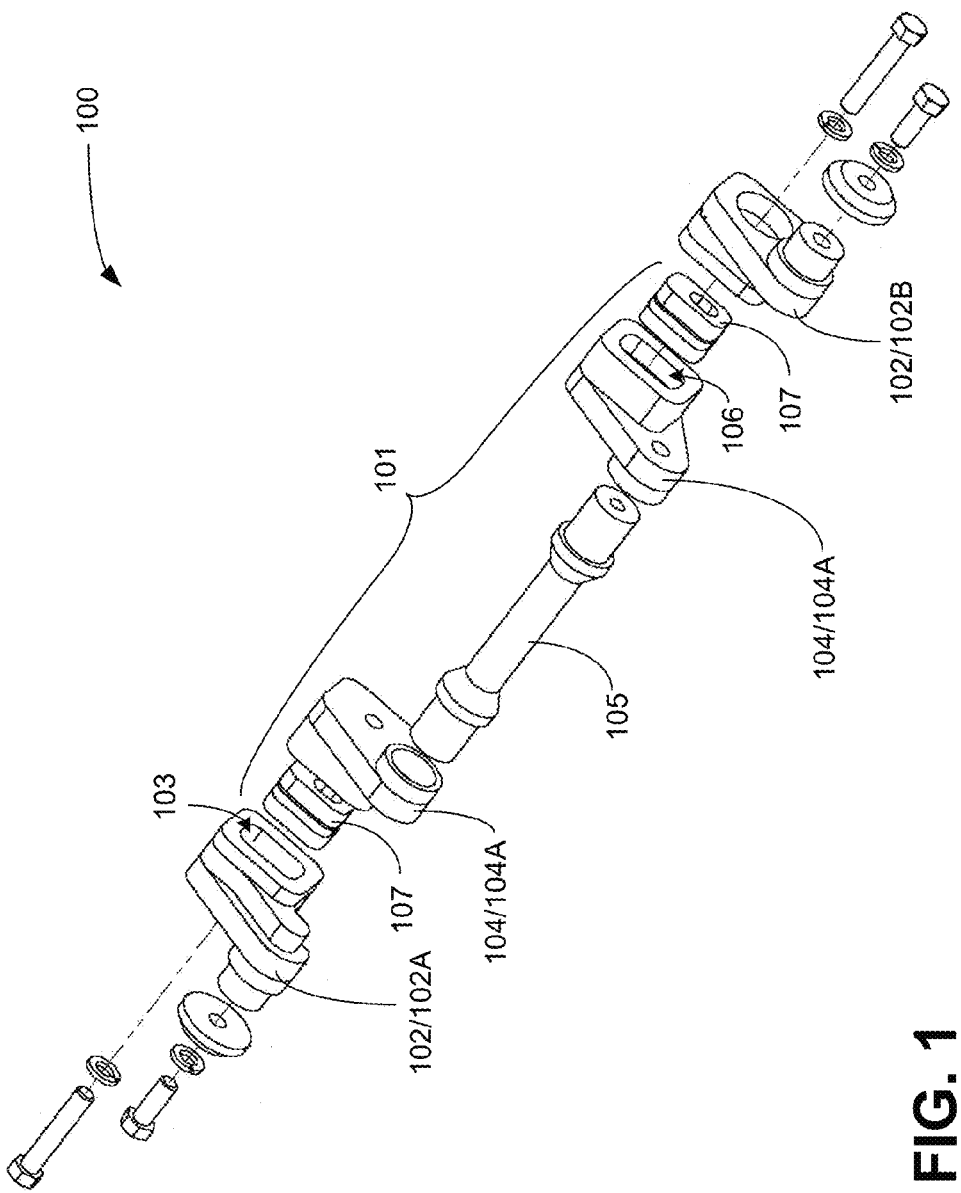
FIG. 1 illustrates a prospective view of a universal vehicle axle assembly.
Figure 2A:
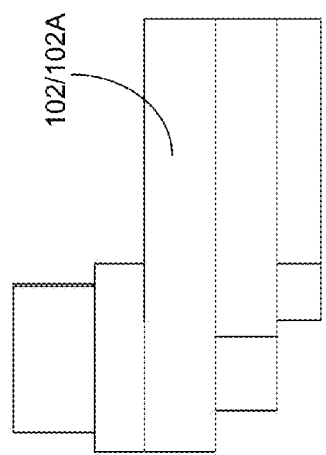
FIG. 2A illustrates a top view of a vehicle axle linkage.
Figure 2C:
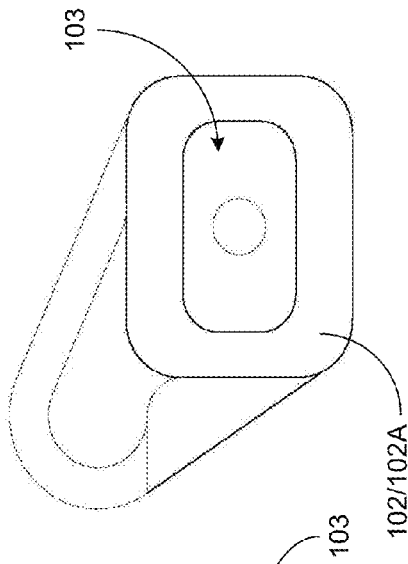
FIG. 2C illustrates a side view of a vehicle axle linkage.
Figure 2B:
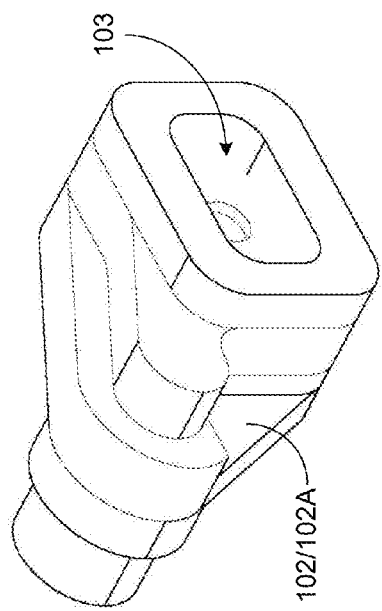
FIG. 2B illustrates a perspective view of a vehicle axle linkage.
Figure 2D:
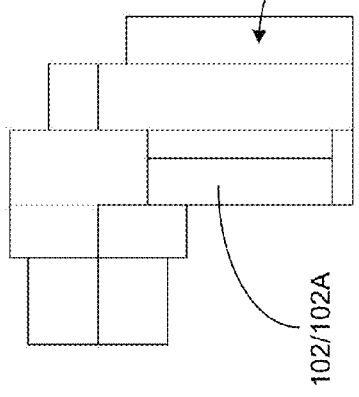
FIG. 2D illustrates front view of a vehicle axle linkage.
Figure 2E:
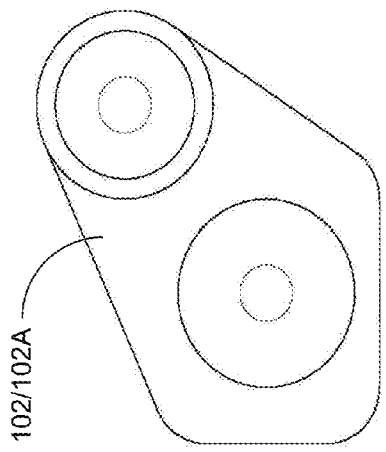
FIG. 2E illustrates side view of a vehicle axle linkage.
Figure 3A:
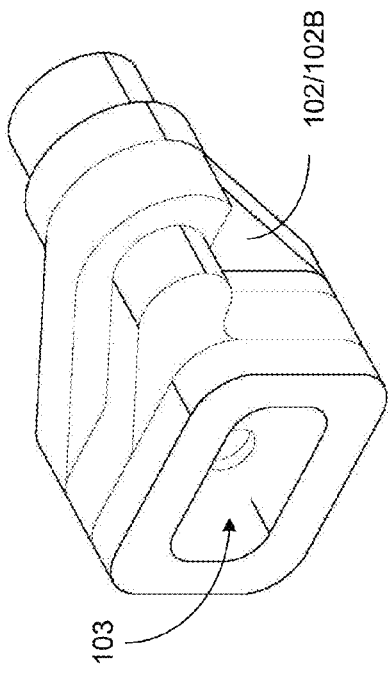
FIG. 3A illustrates a top view of a vehicle axle linkage.
Figure 3C:
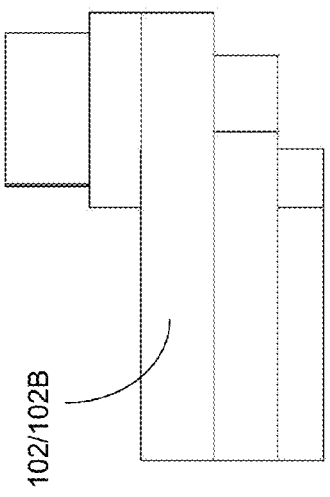
FIG. 3C illustrates a side view of a vehicle axle linkage.
Figure 3B:
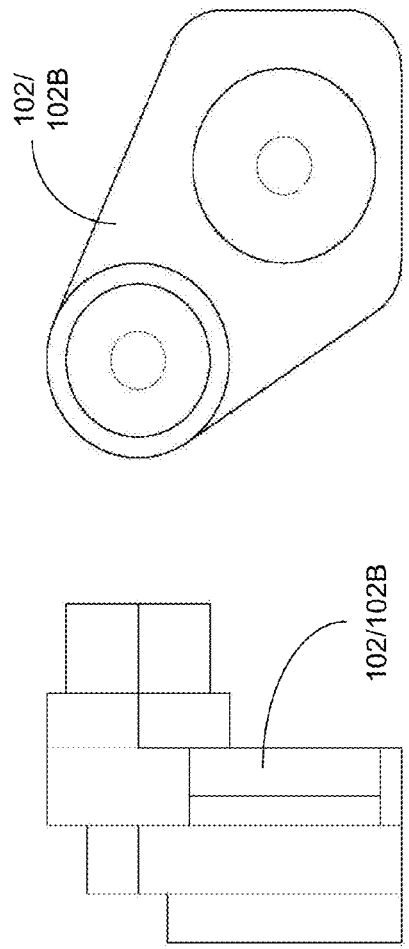
FIG. 3B illustrates a perspective view of a vehicle axle linkage.
Figure 3D:
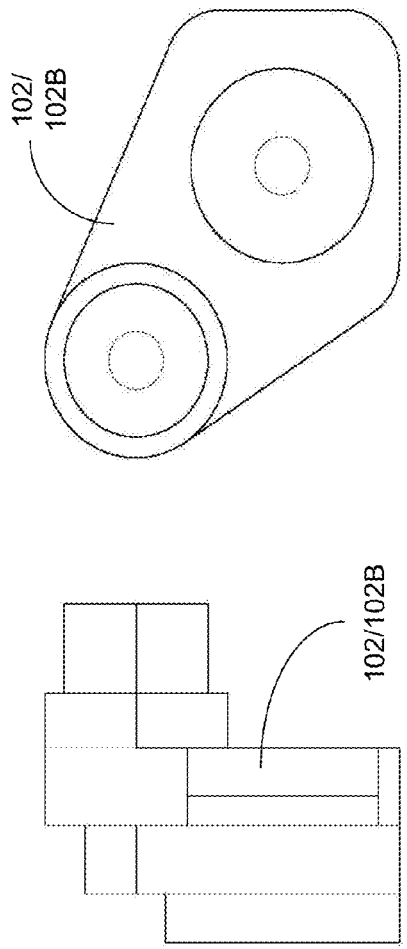
FIG. 3D illustrates front view of a vehicle axle linkage.
Figure 3E:
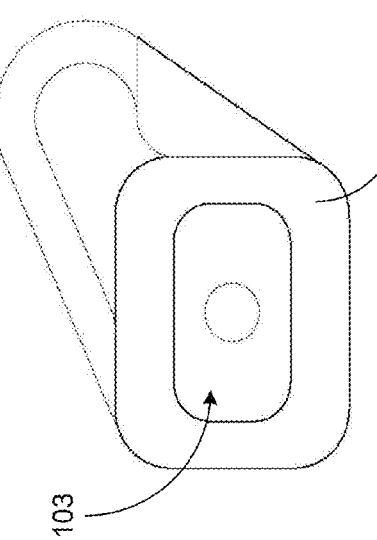
FIG. 3E illustrates side view of a vehicle axle linkage.
Figure 4B:
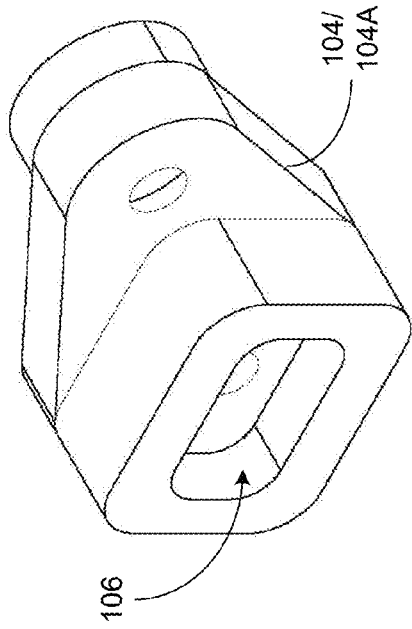
FIG. 4B illustrates a perspective view of an axle bracket.
Figure 4E:
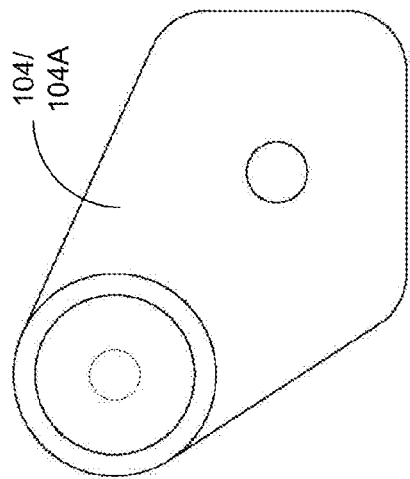
FIG. 4E illustrates side view of an axle bracket.
Figure 4D:
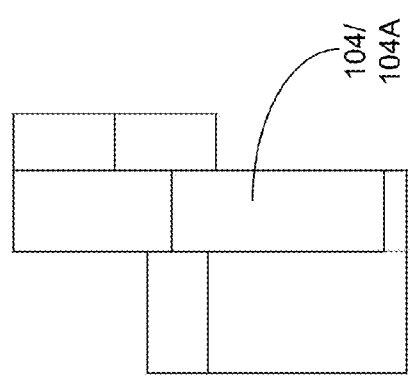
FIG. 4D illustrates front view of an axle bracket.
Figure 4A:
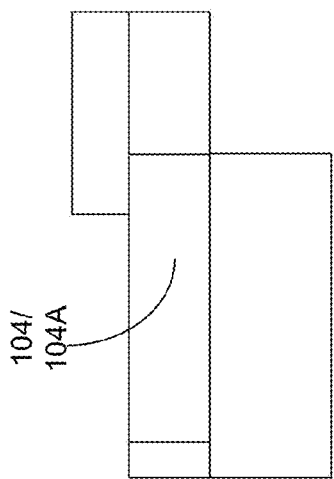
FIG. 4A illustrates a top view of an axle bracket.
Figure 4C:
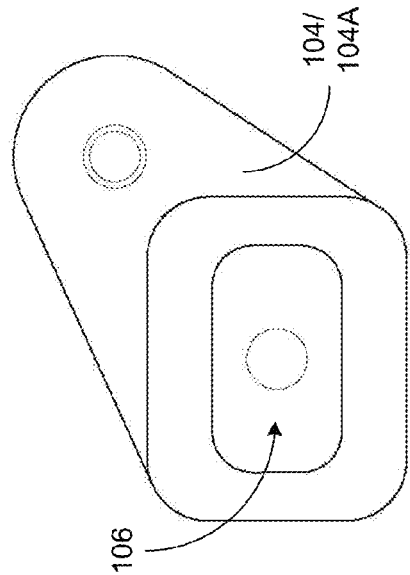
FIG. 4C illustrates a side view of an axle bracket.
Figure 5A:
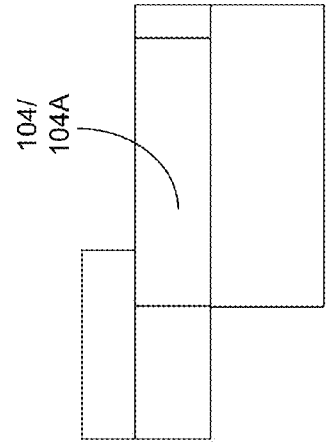
FIG. 5A illustrates a top view of an axle bracket.
Figure 5C:
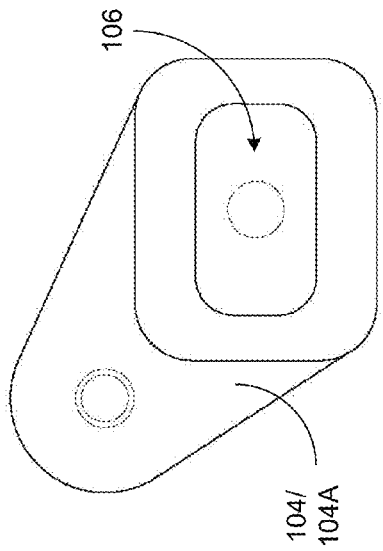
FIG. 5C illustrates a side view of an axle bracket.
Figure 5B:
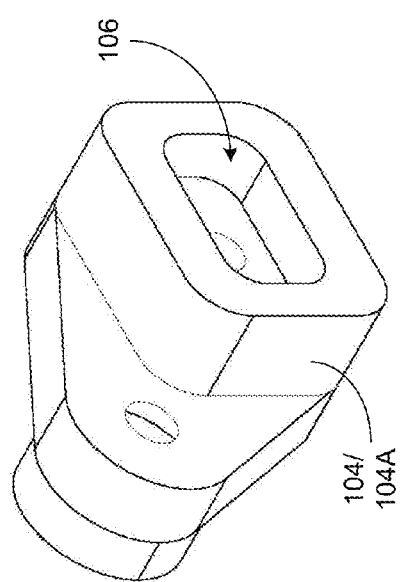
FIG. 5B illustrates a perspective view of an axle bracket.
Figure 5D:
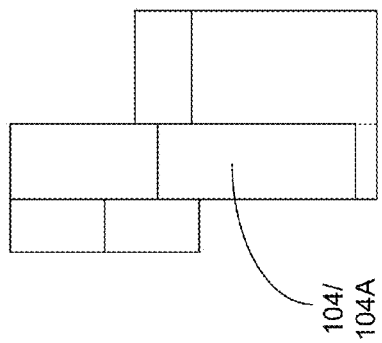
FIG. 5D illustrates front view of an axle bracket.
Figure 5E:
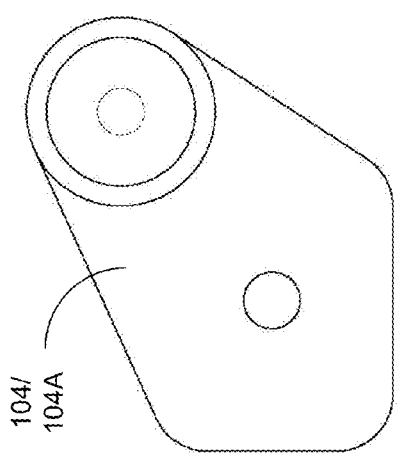
FIG. 5E illustrates side view of an axle bracket.

Referring to FIG. 1, a universal vehicle axle assembly 100 is shown. The vehicle axle assembly 100 may be configured for use in a suspension assembly of a vehicle (not shown). Specifically, the vehicle axle assembly 100 may be configured for use in a rear suspension assembly of a snowmobile.

The vehicle axle assembly 100 may include an axle 101. In operation, one or more wheels (not shown) may be placed on the axle 101 to allow for the rotation of a ground engaging member (e.g. a snowmobile tread, not shown) to cooperatively rotate around the drive train of the vehicle and the axle 101 to allow for transit of the vehicle.

Further, various vehicle designs for products from multiple manufacturers may include one or more axle linkages 102 (e.g. a first axle linkage 102A and a second axle linkage 102B). The axle linkages 102 may be operably coupled to the suspension of the vehicle. The axle linkages 102 may serve to receive the axle 101 to support the wheels within the suspension.

However, it may be the case that the axle linkages 102 for a first manufacturer may differ in size and/or configuration from axle linkages 102 for a second manufacturer. For example, as shown in FIGS. 1, 2A-2E and 3A-3E, the axle linkages 102 may include an axle receiving recess 103. The axle receiving recess 103 may be specifically configured to receive an axle portion projection associated with an axle designed according to a given manufacturer's specifications. However, in light of these manufacturer variations between the axle portion receiving recesses 103, an axle 101 having a single static axle portion projection may not be capable of being received in the variously sized axle portion receiving recesses 103 of the suspension of vehicles from multiple manufacturers.

As such, referring again to FIG. 1, the axle 101 of the inventive vehicle axle assembly 100 may include one or more axle brackets 104 (e.g. axle bracket 104A and axle bracket 104B). The axle brackets 104 may be operably coupled to an axle shaft 105 configured to support the one or more vehicle wheels. As shown in FIGS. 4A-4E and 5A-5E, the axle brackets 104 may include an insert receiving recess 106 as will be further described below.

Figure 6B:
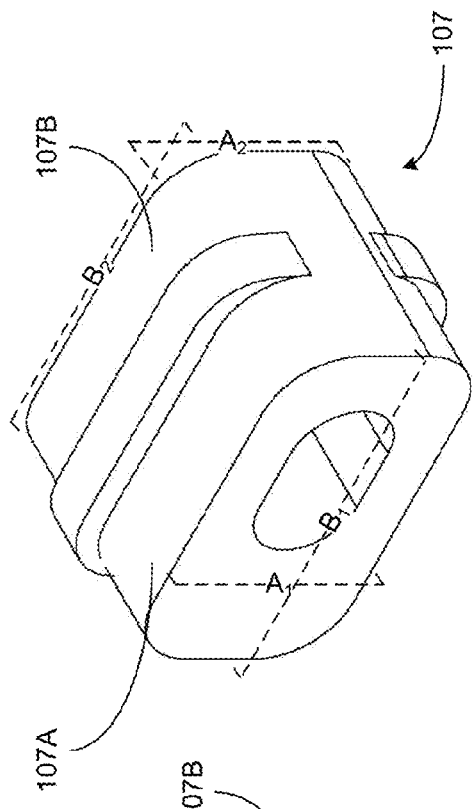
FIG. 6B illustrates a perspective view of an adaptive insert.
Figure 6D:
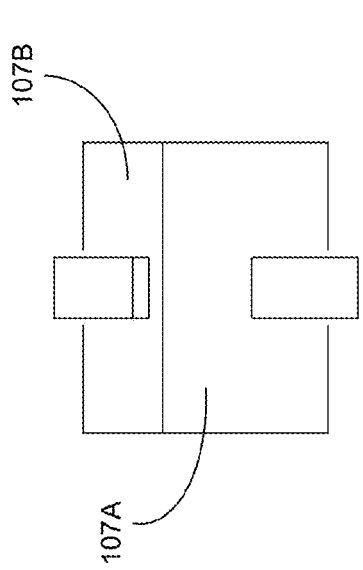
FIG. 6D illustrates front view of an adaptive insert.
Figure 6A:
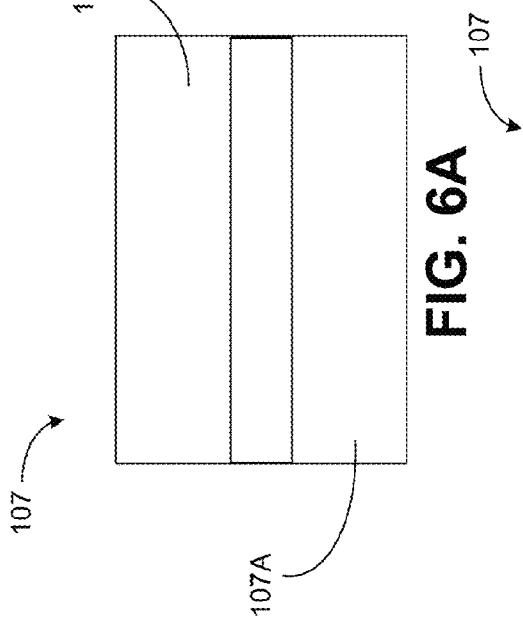
FIG. 6A illustrates a top view of an adaptive insert.
Figure 6C:
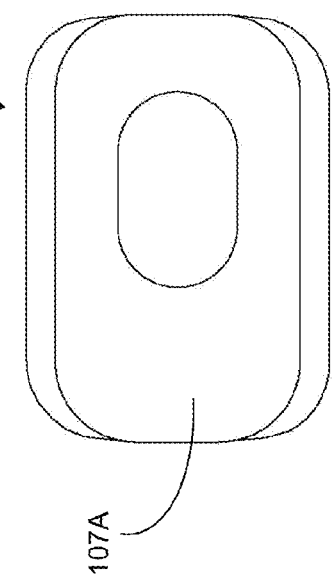
FIG. 6C illustrates a side view of an adaptive insert.

As noted above, the axle receiving recess 103 of the axle linkages 102 may be specifically configured to receive an axle portion projection associated with an axle designed according to a given manufacturer's specifications. In order to utilize a universal axle 101 with multiple different axle linkages 102, the axle 101 may include at least one adaptive insert 107 of a set of adaptive inserts 107. As shown in FIG. 6, an adaptive insert 107 may include a first insert projection 107A and a second insert projection 107B. The insert projection 107A and the insert projection 107B may be sized so as to be securely received within the insert receiving recess 106 of the axle brackets 104 and the axle receiving recess 103 of the axle linkages 102, respectively. Specifically, a plurality of adaptive inserts 107 may be provided each having: a commonly sized insert projection 107A for insertion into commonly sized insert receiving recess 106 of the axle brackets 104; and a differently sized insert projection 107B for insertion into a axle linkages 102 associated with a specific manufacturer. For example, as shown in FIG. 6B, a first adaptive insert 107 may include an insert projection 107A having one or more perimeter dimensions (e.g. dimensions $A_1$ and $B_1$) that are larger than one or more corresponding perimeter dimensions (e.g.

dimensions $A_2$ and $B_2$, respectively) of the insert projection 107B so as to conform to an axle receiving recess 103 of an axle linkage 102 sized according to a first manufacturer's specifications. Further, a second adaptive insert 107 may include an insert projection 107A having one or more perimeter dimensions (e.g. dimensions $A_1$ and $B_1$) that are smaller than one or more corresponding perimeter dimensions (e.g. dimensions $A_2$ and $B_2$, respectively) of the insert projection 107B so as to conform to an axle receiving recess 103 of an axle linkage 102 sized according to a second manufacturer's specifications. Still further, a third adaptive insert 107 may include an insert projection 107A having one or more perimeter dimensions (e.g. dimensions $A_1$ and $B_1$) that are substantially equal to one or more corresponding perimeter dimensions (e.g. dimensions $A_2$ and $B_2$, respectively) of the insert projection 107B so as to conform to an axle receiving recess 103 of an axle linkage 102 sized according to a third manufacturer's specifications.

In a specific embodiment, the axle 101 may be provided as a kit including an axle shaft 105, two axle brackets 104, and two or more distinct adaptive inserts 107. A first adaptive insert 107 may have a insert projection 107B having a first set of dimensions such that the insert projection 107B of the first adaptive insert 107 is configured to be received within an axle receiving recess 103 of an axle linkage 102 for a first vehicle manufacturer. A second adaptive insert 107 may have a insert projection 107B having a second set of dimensions such that the insert projection 107B of the second adaptive insert 107 is configured to be received within an axle receiving recess 103 of an axle linkage 102 for a second vehicle manufacturer.

In this way, a parts supplier need only to provide the axle shaft 105, two axle brackets 104, and the respective adaptive inserts 107 to accommodate repairs to axles for any number of manufacturer designs.

While described herein in the context of adaptive inserts 107 including insert projection 107A and insert projection 107B configured to be received within the insert receiving recess 106 of the axle 101 and the axle receiving recess 103 of the axle linkage 102, respectively, the above descriptions fully contemplate the case where the adaptive inserts 107 may, instead include one or more recesses configured to receive corresponding projections presented by the axle 101 and/or axle linkage 102 such that the male-female relationship between the adaptive inserts 107 and the axle 101 and/or axle linkage 102 is reversed without departing from the scope of the disclosure.

What is claimed:

1. A vehicle axle system comprising:
   at least one axle including an axle shaft portion and at least one axle bracket, the at least one axle bracket including at least one insert recess; and
   a first axle insert having a first end having one or more perimeter dimensions configured for insertion into the at least one insert recess of the at least one axle and a second end having one or more perimeter dimensions larger than the first end;
   a second axle insert having a first end having the one or more perimeter dimensions configured for insertion into the at least one insert recess of the at least one axle and a second end having one or more perimeter dimensions smaller than the first end;
   a third axle insert having a first end having the perimeter dimension configured for insertion into the at least one insert recess of the at least one axle and a second end having one or more perimeter dimensions equal to the first end; and
   at least one bolt,
   wherein each end of the first axle insert, the second axle insert, and the third axle insert includes an aperture configured to receive the at least one bolt for coupling the first axle insert, the second axle insert, or the third axle insert to the axle.

2. The vehicle axle system of claim 1, wherein the at least one axle bracket is operably couplable to the at least one shaft portion.

3. The vehicle axle system of claim 1, wherein the at least one axle bracket includes the at least one insert recess.

4. A multi-vehicle axle kit comprising:
   at least one axle including an axle shaft portion and at least one axle bracket, the at least one axle bracket including at least one insert recess; and
   a first axle insert having a first end configured for insertion into the at least one insert recess and a second end;
   a second axle insert having a first end configured for insertion into the at least one insert recess and a second end; and
   at least one bolt,
   wherein a perimeter geometry of the second end of the first axle insert is different than a perimeter geometry of the second end of the second axle insert, and
   wherein each end of the first axle insert and the second axle insert includes an aperture configured to receive the at least one bolt for coupling the first axle insert or the second axle insert to the axle.

5. The multi-vehicle axle kit of claim 4, wherein the at least one axle bracket is operably couplable to the at least one shaft portion.

6. The multi-vehicle axle kit of claim 4, wherein the at least one axle bracket includes the at least one insert recess.

7. The vehicle axle system of claim 1, wherein each of the first axle insert, the second axle insert, and the third axle insert include a lateral projection between their respective first ends and second ends, the lateral projection having dimensions greater than both the respective first ends and second ends.

8. The vehicle axle system of claim 1, wherein each of the first ends and the second ends of the first axle insert, the second axle insert, and the third axle insert include at least a first edge perpendicular to a second edge.

9. The vehicle axle system of claim 1, wherein an axis defined by a length of the bolt is laterally offset from an axis defined by a length of the axle shaft portion when at least one of the first axle insert, the second axle insert, or the third axle insert is coupled to the at least one axle bracket via the bolt.

10. The multi-vehicle axle kit of claim 4, wherein each of the first axle insert, and the second axle insert include a lateral projection between their respective first ends and second ends, the lateral projection having a perimeter geometry different than both the respective first ends and second ends.

11. The multi-vehicle axle kit of claim 4, wherein each of the first ends and the second ends of the first axle insert, and the second axle insert include at least a first edge perpendicular to a second edge.

12. The multi-vehicle axle kit of claim 11, wherein an axis defined by a length of the bolt is laterally offset from an axis defined by a length of the axle shaft portion when at least one of the first axle insert or the second axle insert is coupled to the axle bracket by the bolt.

* * * * *